United States Patent [19]
Ellgoth et al.

[11] Patent Number: 5,309,938
[45] Date of Patent: May 10, 1994

[54] FRESH WATER SUPPLY SYSTEM FOR AN AIRCRAFT

[75] Inventors: Hubert Ellgoth; Helge Frank, both of Hamburg; Gerd Grunwald, Neuenkirchen; Georg Mai, Bremen; Karolin Mau; Ralf Schliwa, both of Hamburg, all of Fed. Rep. of Germany

[73] Assignee: Deutsche Aerospace Airbus GmbH, Hamburg, Fed. Rep. of Germany

[21] Appl. No.: 954,896

[22] Filed: Sep. 30, 1992

[30] Foreign Application Priority Data
Sep. 30, 1991 [DE] Fed. Rep. of Germany ....... 4132491
Aug. 20, 1992 [DE] Fed. Rep. of Germany ....... 4227516

[51] Int. Cl.$^5$ .......................... F16K 49/00; E03B 7/07
[52] U.S. Cl. ..................... 137/334; 137/341; 137/563; 137/565; 137/899.2
[58] Field of Search ................ 137/899.2, 563, 565, 137/341, 334

[56] References Cited

U.S. PATENT DOCUMENTS

| | | | |
|---|---|---|---|
| 3,643,678 | 2/1972 | Genrich | 137/563 |
| 4,091,261 | 5/1978 | Noland | 137/341 |
| 4,214,147 | 7/1980 | Kraver | 137/341 |
| 4,945,942 | 8/1990 | Lund | 137/563 |
| 5,032,290 | 7/1991 | Yamagata et al. | 137/563 |

*Primary Examiner*—A. Michael Chambers
*Attorney, Agent, or Firm*—W. G. Fasse; W. F. Fasse

[57] ABSTRACT

Fresh water is distributed in an aircraft from at least one supply tank connected through a conduit to at least one water using device, such as a tap, faucet, or the like. The conduit is constructed as a ring conduit, which is provided with or connected to a water conveying device, such as a pump, suction, or pressurizing device. One or more water using devices are connected to the ring conduit by respective branch lines.

13 Claims, 3 Drawing Sheets

FRESH WATER SUPPLY SYSTEM FOR AN AIRCRAFT

FIELD OF THE INVENTION

The invention relates to a fresh water supply system in an aircraft. Such systems comprise at least one fresh water supply tank connected to at least one water tap by a main line. The main line is connected to a conveying device, such as a pump or suction device.

BACKGROUND INFORMATION

Water distribution systems of the just mentioned type are known in commercial aircraft in order to supply hand wash basins in toilets and sinks in onboard kitchens with fresh water. Frequently fresh water is also used for flushing toilet basins. Water that has been used in a hand wash basin and in a kitchen sink becomes waste water and is conventionally discharged from the aircraft into the environment. However, sewage is collected in a waste water tank which may also receive used waste water. Normally, the discharge of waste water takes place with the aid of reduced pressure creating a suction effect in the toilet facilities for conveying the sewage to the collection tank.

Conventional fresh water supply systems have the disadvantage that the supply tank or tanks are connected to the respective facilities by a one-way main line. The term "line" as used herein is intended to cover any suitable pipe or duct. A one-way main line is always filled with water even when water is not used. Further, these lines, as a rule, are installed in the or near to the aircraft bottom that separates a freight space from a passenger cabin.

As a result, the line is exposed to a cold environment, especially when the aircraft is travelling at high elevations. As a result, freeze-up of the water supply lines is possible, unless the lines are heated, for example by electrical heating elements installed in parallel to the water lines. This type of construction is involved and expensive in its manufacture and installation.

It is also conventional to provide these water lines with a continuous inclination for draining the system by gravity flow. Inclined lines cause difficulties when a basic aircraft type is modified to produce a shorter or longer version of the basic type. In both instances substantial problems arise in installing the lines with the required inclination. In these instances assuring the required line inclinations makes it necessary to redesign the line installation with due regard to the available structural length of the aircraft, or rather the length available for the line installation.

OBJECTS OF THE INVENTION

In view of the above it is the aim of the invention to achieve the following objects singly or in combination:

to simplify a fresh, water supply system of the type described above in an aircraft in such a way that it is less dependent on the available installation length and that its manufacture, installation and operation will be more cost efficient than heretofore;

to connect a plurality of branch lines to one or more ring conduits or ring lines, whereby the circulation of the water in the ring line will avoid a freeze-up, especially when the circulation is continuously maintained during flight;

to construct the ring conduit or ring line in several sections and to use a number of sections in accordance with the available installation length of any particular type of aircraft; and to facilitate the refilling of the supply tank or tanks by assuring a proper venting of the system, including the tanks.

SUMMARY OF THE INVENTION

A fresh water supply system for an aircraft is characterized according to the invention in that the connection between a supply tank and fresh water using taps, faucets, and the like is constructed at least in sections as a ring conduit or line and wherein a branch line connects the tap, faucet, or the like, to the ring conduit or line.

A ring conduit makes it possible to maintain a sufficient circulation in the fresh water supply system, so as to avoid the formation of ice crystals, especially in those sections of the ring conduit that pass through cold areas within the aircraft. It is no longer necessary to heat those sections of the conduit that pass, for example, through the cargo space of the aircraft. Any heating devices that may still be needed can be substantially smaller and it is sufficient to provide such a heating device in one location along the supply system rather than installing electrical pipe heaters all along the pipes or lines. Such tempering of the fresh water in one location has been found to be satisfactory. By providing the supply tank, a sufficient fresh water volume is assured, even if a plurality of water using taps, faucets, and the like must be installed.

Where it is necessary to use several ring conduits, for example, in a large aircraft, these conduits may be arranged in a matrix type formation.

In a preferred embodiment at least one of the supply tanks is integrated into the ring conduit, whereby the tank forms part of the ring or circulating conduit. However, in smaller aircraft it may be satisfactory to install but one tank which is connected to the circulating conduit or line by a branch line.

Similarly, dead spaces within the fresh water supply system can be avoided in that the water tap, faucet, or the like is integrated into the circulating ring conduit or line. Such an integrated construction is especially feasible where only one tap or the like is required. However, the number of installation and construction variations is substantially increased when at least one of the faucets, taps, or the like, is connected to the ring conduit or line by a branch line.

By connecting a pump directly into the ring conduit or line, it is possible to maintain a sufficient circulation which prevents a freeze-up. Even an intermittent circulation may be sufficient to prevent a freeze-up.

The use of separate plumbing components or at least the number of such components may be reduced if at least two supply tanks are connected by means of one combination valve to a suction end or pressurizing device so that a direction reversing water circulation is obtained depending on which tank is pressurized.

Incidentally, the above mentioned feature of providing only one heater in a single location reduces the effort and expense and simplifies the installation, especially when a central heater is integrated into the ring conduit. This feature is enhanced by insulating at least certain sections of the ring conduit and any branch lines, whereby a heater of small heating capacity is sufficient. Rather than insulating the branch line or lines, it is possible to manufacture these branch lines of heat insulating material.

In those instances where gravitational flow, for example for draining the system is not required, a substantially horizontal installation of the ring conduit sections is preferred. This feature has the advantage that it provides a substantial flexibility or rather variability of the installation possibilities in accordance with the requirements of the particular aircraft type or in accordance with the requirements of the particular interior outfit of the aircraft. Such a sectional construction is easily adapted to differently dimensioned segments of the aircraft, whereby the conduit sections are coupled to each other at the respective interfaces in a simple manner since the horizontally installed sections are located at the same level. However, where a drainage of the system by gravitational flow is desired, at least portions of the system can be installed with a required slope.

By connecting at least one of the supply tanks to a refill port which is also constructed as a vent, it is possible to assure a simple filling of the tanks without generating unpermissible excess pressures. Similarly, a sufficient venting is thus assured as the discharge of water from the tank progresses.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
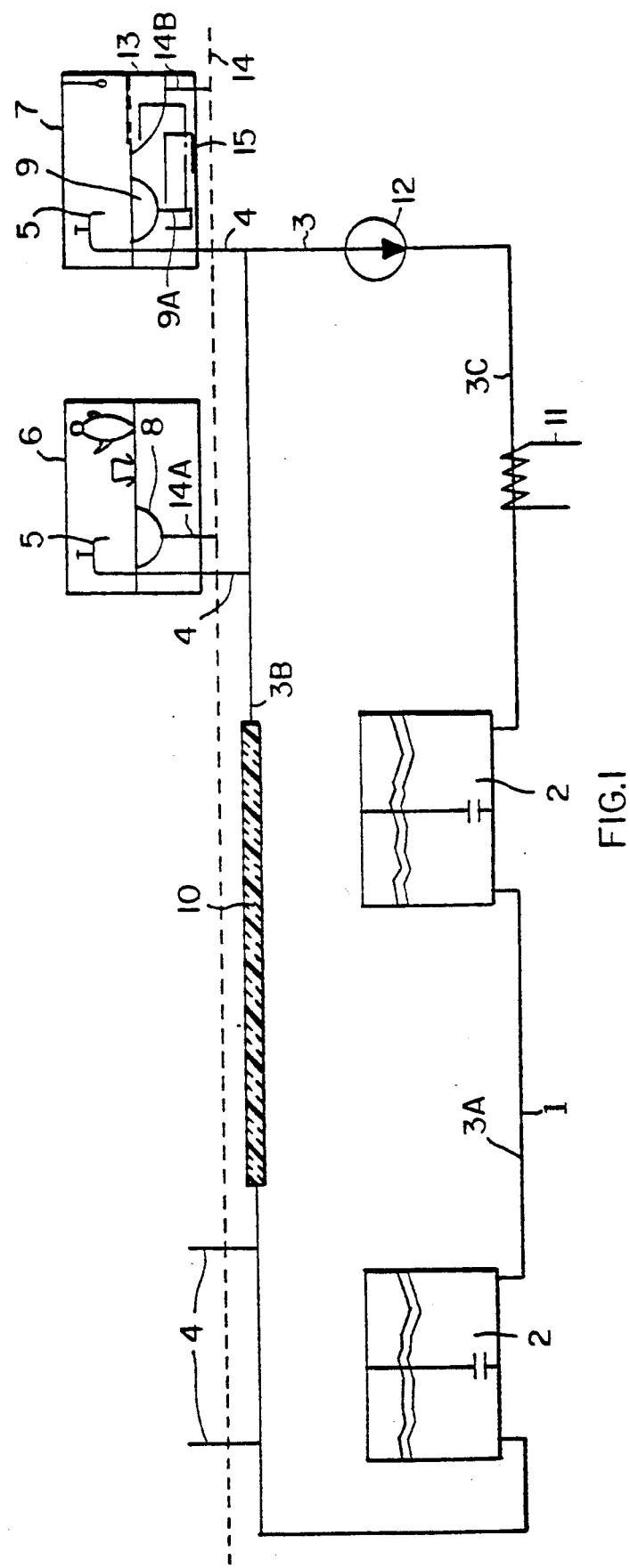
FIG. 1 is a simplified diagram of one embodiment of a fresh water supply system according to the invention with a ring conduit forming the main line.

FIG. 1 shows a fresh water supply and distribution system 1 comprising at least one or two fresh water supply tanks 2. FIG. 1 actually shows two such tanks 2. A main line 3 is constructed as a ring conduit having several sections 3A, 3B, and 3C. As shown in the FIGS. these sections forming the ring conduit are installed to extend substantially horizontally, whereby the tanks 2 are positioned substantially at the same horizontal level as the ring conduit. Branch lines 4 lead to water taps or faucets 5, for example, in a kitchen 6 or in a toilet 7 in the aircraft. The faucet 5 in the kitchen is arranged above a kitchen sink 8. The faucet 5 in the toilet is arranged above a hand wash basin 9. At least a portion of the ring conduit 3, for example, the portion 3B to which the branch lines 4 are connected, is provided with heat insulation 10.

A heater 11, for example, an electrical heater, which heats part of the ring conduit section 3C tempers the water before it enters into the tanks 2. A pump 12 circulates the water in the ring conduit of the main line 3. Heater 11 may be rather small.

Figure 2:
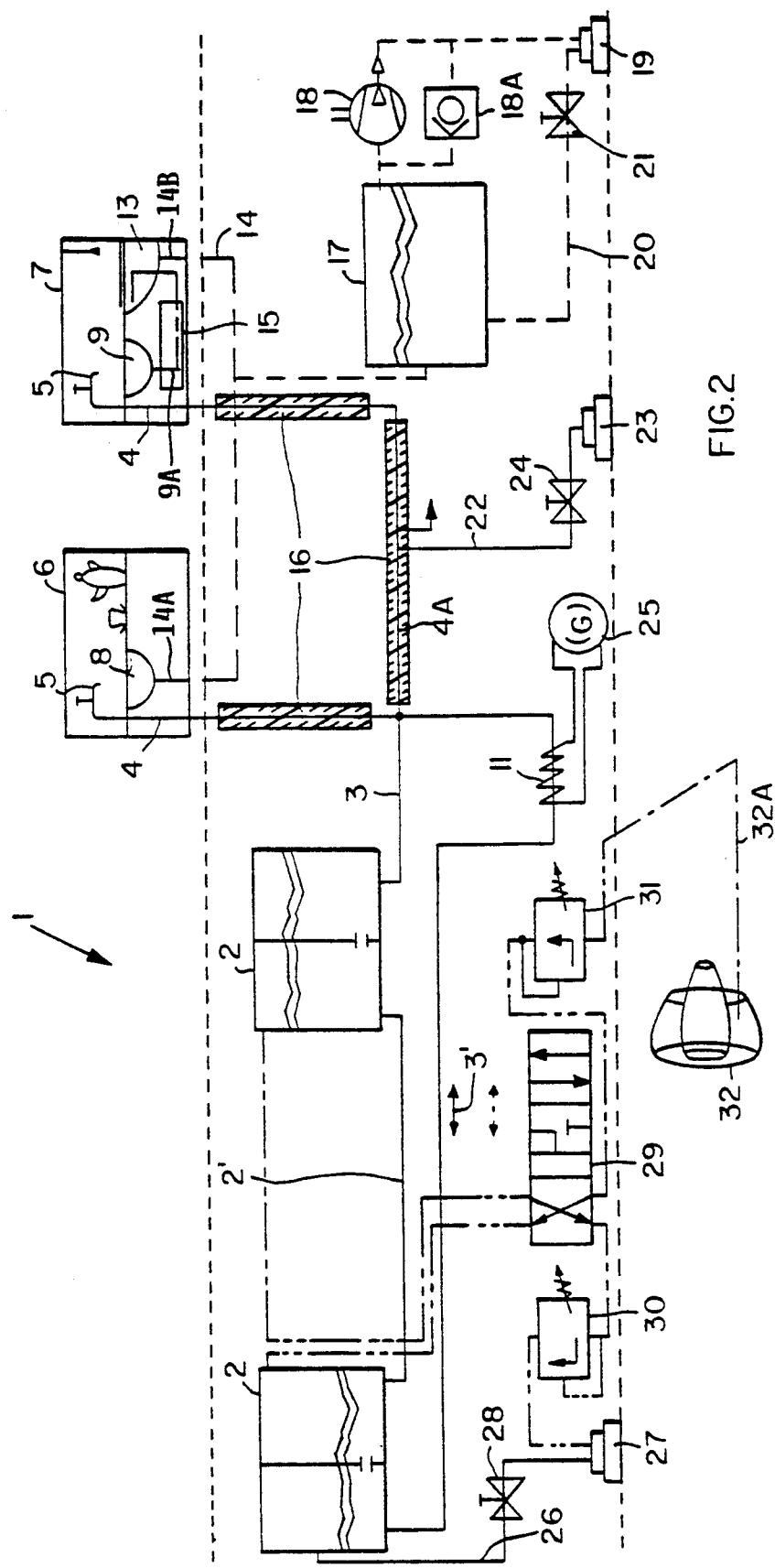
FIG. 2 is an embodiment in which a ring conduit type main line is connected to a source of air pressure or suction through a respective valve so that the water can flow in the main line in one or the other direction.

The kitchen sink 8 and the toilet basin 13 are connected through discharge pipes 14A and 14B to a waste water duct 14 leading to a waste water collection tank shown at 17 in FIG. 2. The basin 9 in the toilet 7 is connected through a discharge pipe 9A into a waste water tank 15. The water in the waste water tank 15 is used for flushing the toilet basin 13. As long as there is sufficient waste water in the tank 15, a separate supply of water for flushing the toilet basin 13 is not necessary. However, the supply of water for flushing the toilet basin 13 may also or instead be connected to the main line 3. The arrangement may be such that toilet flushing may take place either out of the waste water tank 15 or out of the main line 3, depending on the filling level in the waste water tank 15. In order to avoid an overflow in the waste water tank 15, the latter may be provided with an overflow discharge port or an automatic flushing of the toilet may take place in response to a certain filling level within the waste water tank 15.

FIG. 2 shows an embodiment in which individual branch lines are provided with heat insulation 16. The waste water discharge duct 14 is connected to a waste water tank 17 which in turn is connected to a suction pump 18 for producing and maintaining a reduced pressure inside the volume of the waste water tank 17. The pressure side of the suction pump 18 is connected to an evacuation port 19 in the body wall of the aircraft. The evacuation port 19 is also connected through a waste water discharge line 20 and a valve 21 to the tank 17 for emptying on the ground. A non-return valve 18A is connected in parallel to the suction pump 18. A draining port 23 is connected through a drainage line 22 and a valve 24 to the branch lines 4 and 4A. As mentioned, the branch lines 4 lead to a water faucet 5 in the kitchen 6 and to a water faucet 5 in the toilet 7. The valve 24 permits an intentional draining of these branch lines 4, e.g. for maintenance work.

The heater 11 is constructed as a through flow or instantaneous electrical heater energized by a generator 25. One of the two supply tanks 2 is connected through a supply line 26 with a supply port 27 through a valve 28. The supply port 27 may also be constructed for venting the tanks 2 as well as for permitting air entry into these tanks. The valve 28 prevents an unintended discharging of the content of the tanks 2.

Both supply tanks 2 are connected to a combination valve 29 for permitting a water flow or circulation through the tanks 2 and the ring conduit or main line 3 in either direction. A pressure limiter 30 is arranged between the supply port 27 and one port of the combination valve 29. Another port of the combination valve 29 is connected to a pressure reducer 31 which in turn leads through a line 32A to a water tap 32, such as a drinking fountain. The combination control and venting valve 29 operates to alternately pressurize one of the tanks and then the other and vice versa so that a flow direction reversal is achieved in the ring conduit or main line 3 as indicated by the arrow 3'. Valve 29 is connected to a suction or pressurizing device not shown.

Figure 3:
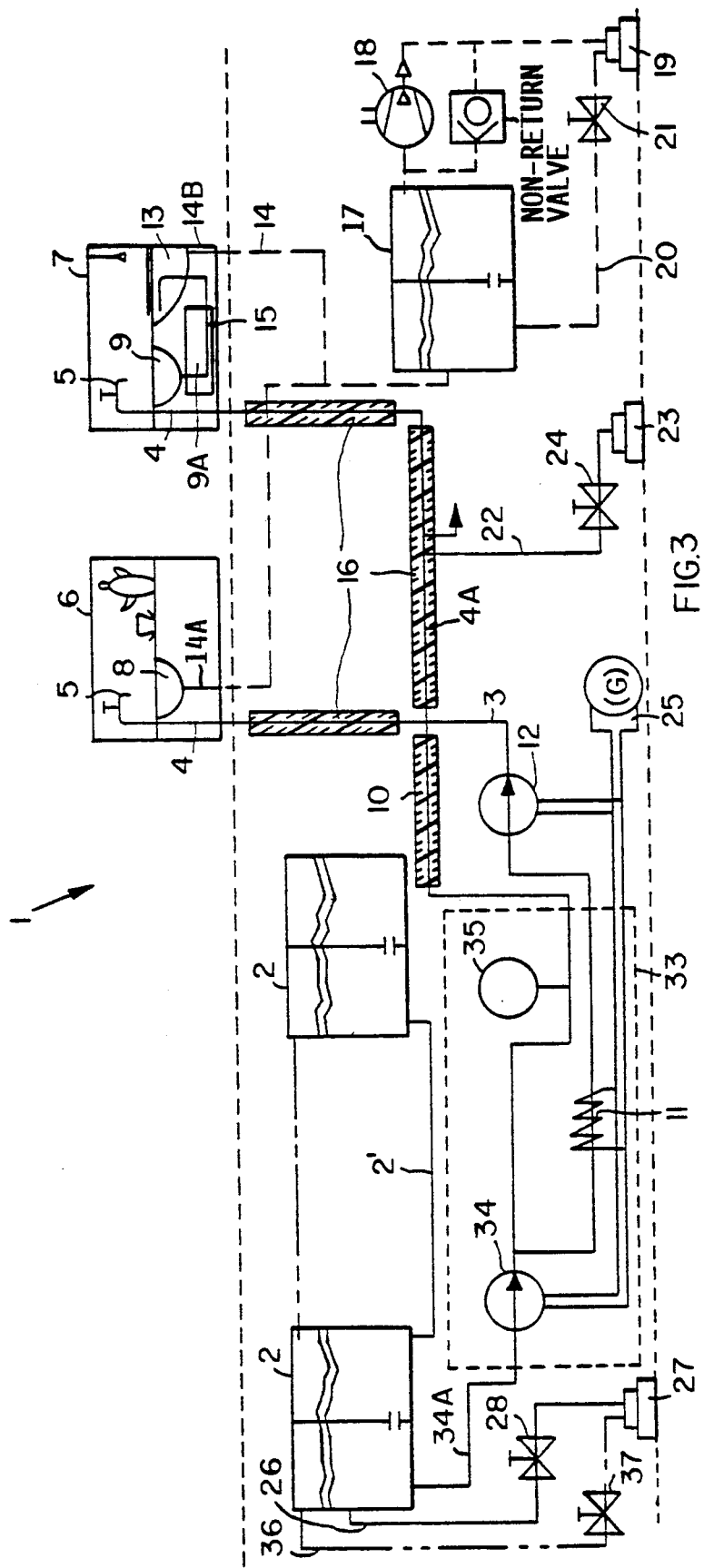
FIG. 3 is a view similar to that of FIG. 2, however, providing a pump in the ring conduit to cause the required water flow.

Referring to FIG. 3, the suction or pressurizing device switched on by the combination valve 29, has been replaced by a water circulating pump 12 and by a further pump 34 to be described below. A hot water automat 33 heated by the through flow heater 11 is connected to the ring main line 3. The pump 34 forms part of the hot water automat 33 which also comprises a pressurized tank 35. The pump 34 feeds water from the tank 2 through the main line 3. In this embodiment the tanks 2 are not connected into the main line 3, rather the tanks 2 are connected to the main line 3 through a pipe 34A leading to the suction inlet of the pump 34, the motor of which is driven by a power source 25.

The tanks 2 are interconnected by a pipe 2'. The two pumps 12 and 34 can be combined into a single pump unit. The tanks 2 are substantially not pressurized, but the pressurized tank 35 assures a uniform pressure in the ring line 3 independently of the water level in any of the tanks 2. The pressurized tank 35 has, for example, a volume of 20 liters which has been found to be sufficient. However, other desirable volumes for the pressurized tank 35 may be used. The tanks 2 are vented through a venting duct 36 connected through a valve 37 to a filling or supply port 27 as mentioned above. The filling port 27 is connected through the filling pipe 26 and a valve 28 to the tank 2. The branch lines 4 and the main ring line 3 can, for example, be emptied by introducing a pressurized gas or by applying suction to these lines. Where the installation provides for a drainage by gravity flow, the tanks and lines may be emptied by such gravity flow. Alternatively, the tanks 2 may be emptied by suction or by blowing.

Instead of using a single loop main line 3 as shown in FIGS. 1, 2, and 3, a plurality of ring lines or loops may be used and arranged in a matrix type structure. Depending on the arrangement of such a matrix structure, one or several water conveying devices for the fresh water may be provided. Further, the tanks may either be integrated into the loops, or at least into one loop or they may be connected through branch lines as shown at 34A in FIG. 3. Similarly, faucets, taps and the like may be connected through branch lines 4 to the main line 3 or these taps and faucets may be connected directly into the main line by respective pipe couplings, thereby forming an integral component of the main line 3.

The above discussed embodiments of the invention operate on the basis of a substantially continuous water transport or flow through the ring conduit 3. However, the present system works just as well when an intermittent water flow is maintained so that during one time duration water moves through the system while during intermediate time durations air is transported through the system, or at least through the ring conduit 3.

Instead of constructing the heater 11 as an automatic through flow heater, an immersion heater may be used in one or both tanks. Also a heat exchanger could be connected to the tanks instead of a through flow heater and instead of an immersion heater. The heat exchanger could be operated with waste heat from the cabin. The fresh water flow may be maintained by one of the three above mentioned possibilities, namely the pump 12 or an alternating pressurization and evacuation or even by gravity flow.

Although the invention has been described with reference to specific example embodiments it will be appreciated that it is intended to cover all modifications and equivalents within the scope of the appended claims.

What we claim is:

1. A fresh water supply system in an aircraft, comprising at least one fresh water supply tank, water tap means in said aircraft, main line means connecting said water tap means to said supply tank, said main line means being installed at a substantially horizontal level in said aircraft, said water supply tank being positioned substantially at the same horizontal level, at least one water conveying means connected to said system for transporting fresh water from said supply tank to said water tap, said main line means having at least one section formed as a ring conduit (3) having a horizontal length and at least one tap branch line (4) connecting said water tap means to said ring conduit, said water conveying means maintaining a water circulation in said ring conduit, said system further comprising heating means connected only to a portion of said ring conduit, said portion of said ring conduit having a short length relative to said horizontal length of said ring conduit, said system further comprising a heat insulation (10) provided on at least a portion of said ring conduit, said heat insulation in combination with said circulation optimally reducing said short length so that freeze-up is avoided with an optimally low heating energy input.

2. The fresh water supply system of claim 1, wherein said ring conduit comprises a plurality of loops.

3. The fresh water supply system of claim 1, wherein said at least one fresh water supply tank is integrated into said ring conduit, thereby forming part of said ring conduit.

4. The fresh water supply system of claim 1, further comprising at least one supply branch line, and wherein at least one of said supply tanks is connected by said supply branch line to said ring conduit.

5. The fresh water supply system of claim 1, wherein said water tap means comprise at least one water tap integrated into said ring conduit, whereby said at least one water tap forms part of said ring conduit.

6. The fresh water supply system of claim 1, wherein said water tap means comprise a plurality of taps, at least one of which is connected by said tap branch line to said ring conduit.

7. The fresh water supply system of claim 1, wherein said water circulation is maintained by said conveying means as a continuous circulation of fresh water in said system.

8. The fresh water supply system of claim 1, wherein said fresh water conveying means comprise a pump connected to said ring conduit.

9. The fresh water supply system of claim 8, wherein said pump is operated intermittently for maintaining said water circulation as an intermittent fresh water circulation in said ring conduit during certain time intervals.

10. The fresh water supply system of claim 1, comprising at least two fresh water supply tanks connected to said ring conduit, a combination valve (29) connected to said at least two fresh water supply tanks, said water conveying means comprising a pump connected to said combination valve for alternately pressurizing one of said two tanks with excess pressure for generating an alternating water circulation from one of said at least two supply tanks.

11. The fresh water supply system of claim 1, wherein at least one of said tap branch lines comprises a heat insulation (16).

12. The fresh water supply system of claim 1, wherein said ring conduit comprises several sections, at least one of said ring conduit sections being arranged for gravitational water flow in said at least one section.

13. The fresh water supply system of claim 1, further comprising fresh water refill means (26, 27) connected to at least one of said supply tanks, and means as part of said refill means for venting said refill means.

* * * * *

UNITED STATES PATENT AND TRADEMARK OFFICE
CERTIFICATE OF CORRECTION

PATENT NO. : 5,309,938
DATED      : May 10, 1994
INVENTOR(S) : Hubert Ellgoth et al.

It is certified that error appears in the above-indentified patent and that said Letters Patent is hereby corrected as shown below:

Column 1, line 4, insert the following information:

--CROSS-REFERENCE TO RELATED APPLICATIONS

The present application relates to U. S. Patent Application Serial No.: 07/954,892, filed on September 30, 1992, and U. S. Patent Application Serial No.: 07/954,898, filed on September 30, 1992.--

Signed and Sealed this

Twenty-third Day of August, 1994

Attest:

BRUCE LEHMAN

*Attesting Officer*   *Commissioner of Patents and Trademarks*